United States Patent
Sugino et al.

(10) Patent No.: US 10,007,508 B2
(45) Date of Patent: Jun. 26, 2018

(54) MEMORY SYSTEM HAVING FIRMWARE AND CONTROLLER

(71) Applicant: TOSHIBA MEMORY CORPORATION, Minato-ku (JP)

(72) Inventors: Kentaro Sugino, Yokohama (JP); Hiroaki Tanaka, Hadano (JP); Ayumu Anzai, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 612 days.

(21) Appl. No.: 14/636,614

(22) Filed: Mar. 3, 2015

(65) Prior Publication Data

US 2016/0070477 A1    Mar. 10, 2016

Related U.S. Application Data

(60) Provisional application No. 62/047,946, filed on Sep. 9, 2014.

(51) Int. Cl.
| | | |
|---|---|---|
| *G06F 3/06* | (2006.01) | |
| *G06F 8/654* | (2018.01) | |
| *G06F 9/445* | (2018.01) | |

(52) U.S. Cl.
CPC .............. *G06F 8/654* (2018.02); *G06F 3/065* (2013.01); *G06F 3/0607* (2013.01); *G06F 3/0655* (2013.01); *G06F 3/0688* (2013.01); *G06F 8/665* (2013.01)

(58) Field of Classification Search
CPC ...... G06F 3/0607; G06F 3/065; G06F 3/0655; G06F 3/0688; G06F 8/654
See application file for complete search history.

(56) References Cited

U.S. PATENT DOCUMENTS

| 8,074,018 | B2 | 12/2011 | Kawada et al. | |
|---|---|---|---|---|
| 2003/0217310 | A1* | 11/2003 | Ebsen | G06F 11/1438 |
| | | | | 714/42 |
| 2007/0263983 | A1 | 11/2007 | Ando et al. | |
| 2009/0138650 | A1* | 5/2009 | Lin | G06F 8/65 |
| | | | | 711/103 |
| 2009/0282399 | A1* | 11/2009 | Kamrowski | G06F 8/68 |
| | | | | 717/174 |
| 2013/0067455 | A1* | 3/2013 | Miao | G06F 8/665 |
| | | | | 717/173 |
| 2014/0059278 | A1 | 2/2014 | Schuh et al. | |
| 2014/0344797 | A1* | 11/2014 | Rajagopalan | G06F 8/64 |
| | | | | 717/169 |

FOREIGN PATENT DOCUMENTS

| JP | 11-161442 A | 6/1999 |
|---|---|---|
| JP | 2007-293802 A | 11/2007 |

* cited by examiner

*Primary Examiner* — Aracelis Ruiz
(74) *Attorney, Agent, or Firm* — Oblon, McClelland, Maier & Neustadt, L.L.P.

(57) ABSTRACT

According to one embodiment, upon reception of a command and an archive file for updating first firmware, a controller selects first information corresponding to information for identifying the memory system from a plurality of first information included in the header. The controller acquires second information included in the selected first information, and acquires one of a plurality of second firmware included in the archive file based on the acquired second information, to update the first firmware by the acquired second firmware.

8 Claims, 14 Drawing Sheets

| | | | | |
|---|---|---|---|---|
| 6h | Header | | HEADER VERSION | 0001h | 61 |
| 6P | PARAMETER UNIT | | ARCHIVE FILE SIZE | 908 | 62 |
| 6 | | | NUMBER OF FW | 4 | 63 |
| 6F | FRONT-END UNIT | FW1 property | PARAMETER-UNIT OFFSET VALUE | 8 | 71 |
| | | | PARAMETER UNIT SIZE | 8 | 72 |
| 6B | BACK-END UNIT | | FRONT-END-UNIT OFFSET VALUE | 40 | 73 |
| | | | FRONT-END UNIT SIZE | 256 | 74 |
| | | | BACK-END-UNIT OFFSET VALUE | 296 | 75 |
| 64A | | | BACK-END UNIT SIZE | 300 | 76 |
| | | | CUSTOMER CUSTOMIZATION INFORMATION | 000000DEh | 77 |
| | | | HW INFORMATION | 128 | 78 |
| | | FW2 property | PARAMETER-UNIT OFFSET VALUE | 16 | |
| | | | PARAMETER UNIT SIZE | 8 | |
| | | | FRONT-END-UNIT OFFSET VALUE | 40 | |
| 64B | | | FRONT-END UNIT SIZE | 256 | |
| | | | BACK-END-UNIT OFFSET VALUE | 596 | |
| | | | BACK-END UNIT SIZE | 312 | |
| | | | CUSTOMER CUSTOMIZATION INFORMATION | 000000DEh | |
| | | | HW INFORMATION | 256 | |
| | | FW3 property | PARAMETER-UNIT OFFSET VALUE | 24 | |
| | | | PARAMETER UNIT SIZE | 8 | |
| | | | FRONT-END-UNIT OFFSET VALUE | 40 | |
| 64C | | | FRONT-END UNIT SIZE | 256 | |
| | | | BACK-END-UNIT OFFSET VALUE | 596 | |
| | | | BACK-END UNIT SIZE | 312 | |
| | | | CUSTOMER CUSTOMIZATION INFORMATION | 000000DEh | |
| | | | HW INFORMATION | 512 | |
| | | FW4 property | PARAMETER-UNIT OFFSET VALUE | 32 | |
| | | | PARAMETER UNIT SIZE | 8 | |
| | | | FRONT-END-UNIT OFFSET VALUE | 40 | |
| 64D | | | FRONT-END UNIT SIZE | 256 | |
| | | | BACK-END-UNIT OFFSET VALUE | 596 | |
| | | | BACK-END UNIT SIZE | 312 | |
| | | | CUSTOMER CUSTOMIZATION INFORMATION | 000000DEh | |
| | | | HW INFORMATION | 960 | |

| | | |
|---|---|---|
| 6P0 — PARAMETER UNIT No. 0 | 8 |
| 6P1 — PARAMETER UNIT No. 1 | 16 |
| 6P2 — PARAMETER UNIT No. 2 | 24 |
| 6P3 — PARAMETER UNIT No. 3 | 32 |
| 6F0 — FRONT-END UNIT No. 0 | 40 |
| 6B0 — BACK-END UNIT No. 0 | 296 |
| 6B1 — BACK-END UNIT No. 1 | 596 |

6h — Header
6P — PARAMETER UNIT
6F — FRONT-END UNIT
6B — BACK-END UNIT

US 10,007,508 B2

MEMORY SYSTEM HAVING FIRMWARE AND CONTROLLER

CROSS-REFERENCE TO RELATED APPLICATIONS

This application is based upon and claims the benefit of priority from U.S. Provisional Application No. 62/047,946, filed on Sep. 9, 2014; the entire contents of which are incorporated herein by reference.

FIELD

Embodiments described herein relate generally to a memory system including a non-volatile semiconductor memory.

BACKGROUND

In a memory system including a non-volatile semiconductor memory such as a flash memory, firmware is stored in the non-volatile semiconductor memory. The firmware is loaded to a volatile memory from the non-volatile semiconductor memory at the time of power-on of the memory system. A processor executes the firmware, thereby controlling a plurality of constituent elements configuring the memory system.

Even in a memory system of the same model, the firmware is updated according to its customer, usage environment, or variations of coupling parts. At the time of update of the firmware, if a firmware image is prepared for the number of variations and the firmware consistent with the applicable environment is manually selected, the cost burden for the maintenance and verification works increases.

BRIEF DESCRIPTION OF THE DRAWINGS

FIG. 9 illustrates a format of a header of a firmware image in an archive format according to the second embodiment;

FIG. 10 illustrates a format of a firmware body of the firmware image in an archive format according to the second embodiment;

DETAILED DESCRIPTION

In general, according to one embodiment, a memory system includes a non-volatile semiconductor memory and a controller. The non-volatile semiconductor memory stores therein first firmware. The controller executes the first firmware to control the non-volatile semiconductor memory. The controller receives a command for updating the first firmware, and upon start of reception of a firmware image in an archive format (hereinafter, "archive file"), acquires a header of the archive file. The archive file includes the header and a plurality of pieces of second firmware. The header includes a plurality of first information that identifies the second firmware. Each of the first information includes second information indicating a position on the archive file of corresponding firmware of the plurality of second firmware. The controller acquires the header of the received archive file. The controller selects first information corresponding to information for identifying the memory system from the plurality of first information included in the acquired header. The controller acquires the second information included in the selected first information, and acquires one of the pieces of second firmware included in the archive file based on the acquired second information, to update the first firmware by the acquired second firmware.

Exemplary embodiments of a memory system will be explained below in detail with reference to the accompanying drawings. The present invention is not limited to the following embodiments.

(First Embodiment)

Figure 1:
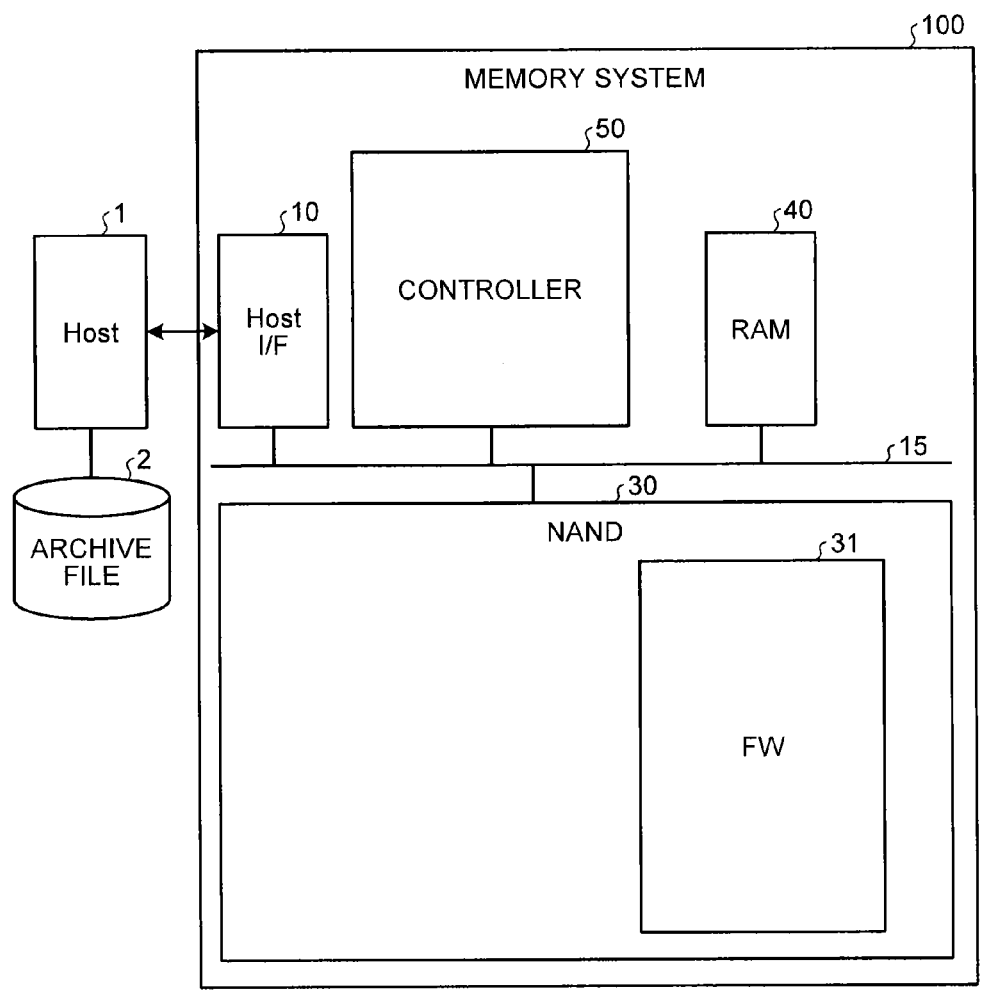
FIG. 1 is a functional block diagram illustrating an internal configuration of a memory system according to a first embodiment.

FIG. 1 is a block diagram illustrating a configuration example of a memory system 100 according to a first embodiment. The memory system 100 is connected to a host device (hereinafter, "host") 1 via a host interface 10. The memory system 100 is, for example, an SSD (Solid State Drive), and functions as an external memory device of the host 1. The host 1 is, for example, a personal computer, a mobile phone, or an image pickup device.

The memory system 100 includes the host interface 10, a non-volatile memory (hereinafter, "NAND") 30, a RAM 40 being a volatile semiconductor memory capable of performing high-speed access at a higher speed than the NAND 30, a controller 50, and a bus 15.

The host interface 10 performs communication of a command, data, a status report or the like with the host 1, and is an SATA (Serial Advanced Technology Attachment) interface in the present embodiment. However, the present invention can be easily applied also to a memory system having a host interface in other formats such as SAS (Serial Attached SCSI), and PCI Express.

Figure 2:
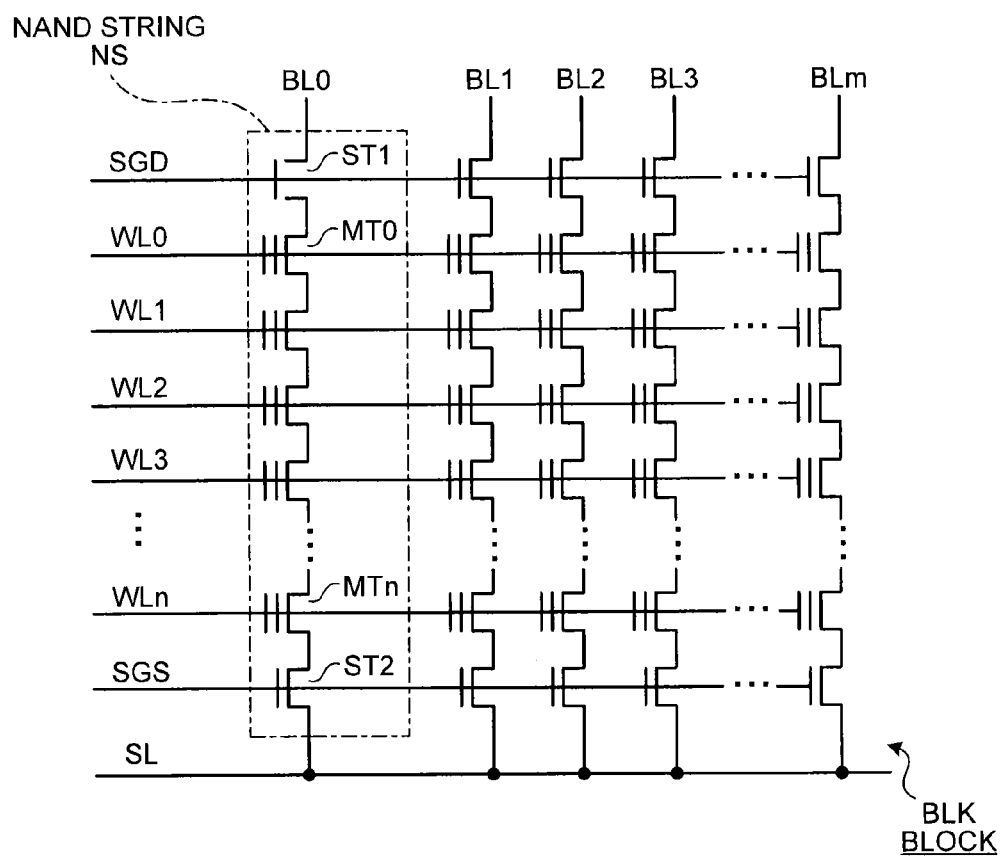
FIG. 2 illustrates a circuit configuration example of a block of a NAND memory.

The NAND 30 includes one or a plurality of memory chips. In the NAND 30, write and read are performed generally in a data unit referred to as "page", and erasure is performed in a data unit referred to as "block". FIG. 2 illustrates a circuit configuration example of a block of the NAND 30. As shown in FIG. 2, a block BLK of the NAND 30 includes (m+1) (m is an integer equal to or larger than 0) NAND strings NS. Each NAND string NS has (n+1) (n is an integer equal to or larger than 0) memory cell transistors MT0 to MTn serially connected, while sharing a diffusion region (a source region or a drain region) between adjacent memory cell transistors MT, and selection transistors ST1 and ST2 respectively arranged at both ends of a column of the (n+1) memory cell transistors MT0 to MTn.

Word lines WL0 to WLn are respectively connected to a control gate electrode of the memory cell transistors MT0 to MTn configuring the NAND string NS, and the same word line WLi (i=0 to n) commonly connects the memory cell transistors MTi (i=0 to n) in the respective NAND strings NS. That is, the control gate electrodes of the memory cell transistors MTi in the same row in the block BLK are connected to the same word line WLi.

The respective memory cell transistors MT0 to MTn are configured by a field-effect transistor having a stacked gate structure formed on a semiconductor substrate. The stacked gate structure includes a charge accumulating layer (a floating gate electrode) formed on the semiconductor substrate via a gate dielectric film and a control gate electrode formed on the charge accumulating layer via an inter-gate dielectric film. In the memory cell transistors MT0 to MTn, a threshold voltage changes according to the number of electrons accumulated in the floating gate electrode and data can be stored according to the change of the threshold voltage.

Bit lines BL0 to BLm are respectively connected to each drain of the (m+1) selection transistors ST1 in one block BLK, and a selection gate line SGD is commonly connected to the gate thereof. A source of the selection transistor ST1 is connected to the drain of the memory cell transistor MT0. Similarly, a source line SL is commonly connected to each source of the (m+1) selection transistors ST2 in one block BLK, and a selection gate line SGS is commonly connected to the gate thereof. Furthermore, the drain of the selection transistor ST2 is connected to the source of the memory cell transistor MTn.

In the present embodiment, the (m+1) memory cell transistors MTi connected to the same word line WLi are referred to as "memory cell group". When the memory cell is a single-level cell (SLC), one memory cell group corresponds to one page. When the memory cell is a multi-level cell (MLC), one memory cell group corresponds to a plurality of pages. Each memory cell is connected to the word line and to the bit line as well. Each memory cell can be identified by an address identifying the word line and an address identifying the bit line.

The non-volatile memory 30 is a NAND flash memory in the present embodiment, but the applicable range of the present invention is not limited to NAND flash memories and can be a three-dimensional structure flash memory, a ReRAM (Resistance Random Access Memory), a FeRAM (Ferroelectric Random Access Memory), or a hard disk.

The NAND 30 stores therein user data, to which write is instructed by the host 1, and management information managed by the RAM 40. The NAND 30 also stores therein firmware (FW) 31.

The RAM 40 has a memory region for storing and updating the management information for managing the memory system 100. The management information includes a mapping table representing a relation between a logical address specified by the host 1 and a memory position (a physical address) on the NAND 30. The RAM 40 also includes a storage region for temporarily storing the firmware to be updated. As the RAM 40, a volatile SRAM (Static Random Access Memory) or a DRAM (Dynamic Random Access Memory) is employed. The management information managed by the RAM 40 is management information stored in the NAND 30, which is loaded at the time of startup.

The function of the controller 50 is realized by a processor that executes the firmware 31 stored in the NAND 30 and various hardware circuits. The controller 50 executes control with respect to various commands such as a write command and a read command received from the host 1. The control executed by the controller 50 includes data transfer control between the host 1 and the NAND 30 via the RAM 40, and update and management of various pieces of management information stored in the RAM 40 and the NAND 30. The controller 50 also performs internal processing such as garbage collection.

The firmware 31 is stored in the NAND 30 at the time of power off. At the time of turning on the power, the firmware 31 is read to a memory in the RAM 40 or in the controller 50 by an IPL (Initial Program Loader) stored in a ROM (Read Only Memory) (not shown). The function of the firmware is executed by a processor in the controller 50.

The firmware 31 of the memory system 100 is updated in a shipment stage of the memory system 100, in a production stage of the host 1 in which the memory system 100 is incorporated, and in a stage at which an end user uses the firmware. A case where the firmware is updated in the production stage of the host 1 is explained here as an example. When update of the firmware 31 of the memory system 100 is performed, the manufacturer of the host 1 prepares an archive file 2 including the firmware to be updated. The archive file 2 is acquired through a memory medium such as a memory card and an optical disk, or a network.

Figure 3:
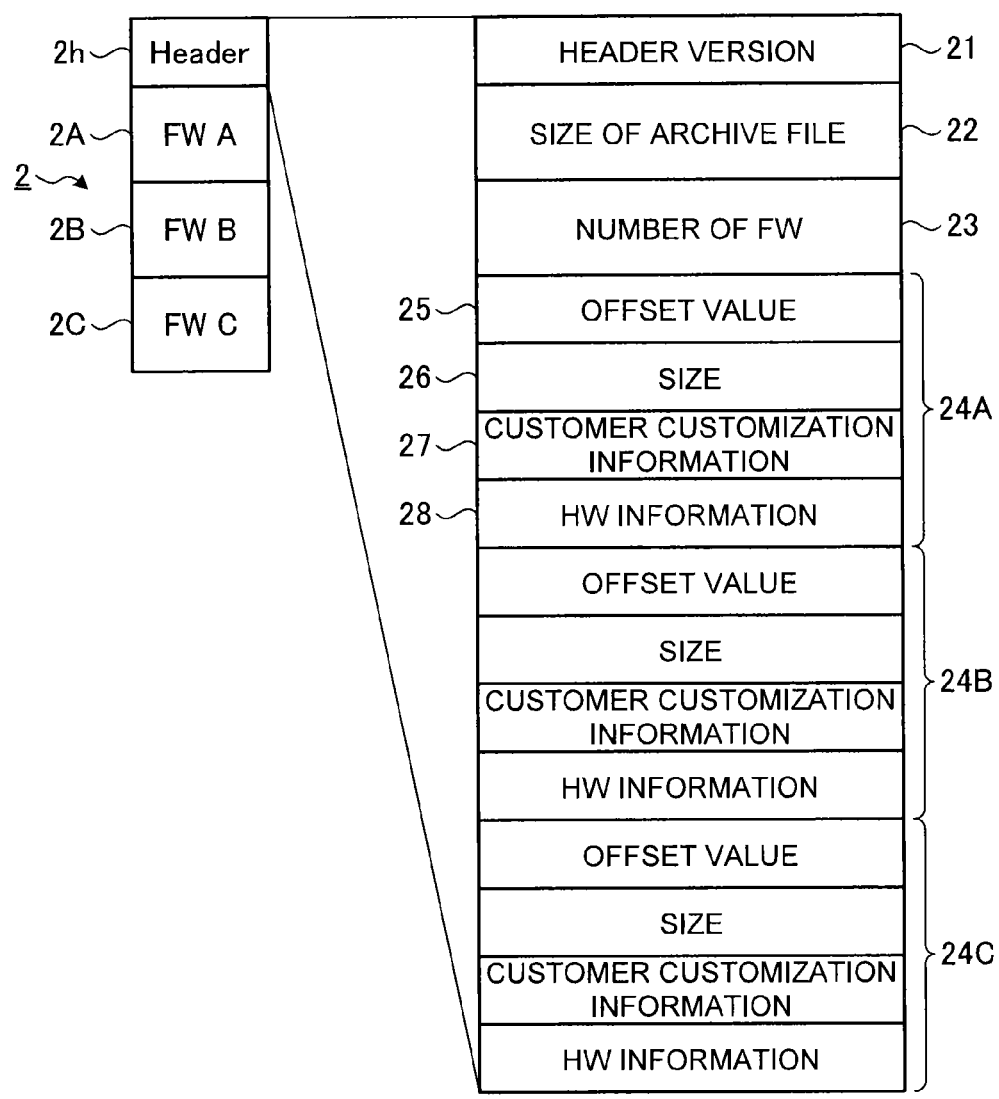
FIG. 3 illustrates a data format of a firmware image in an archive format according to the first embodiment.

FIG. 3 illustrates a data format of the archive file 2. The archive file 2 is one binary data string. The archive file 2 includes a header 2h and a plurality of firmware 2A to 2C. The header 2h includes a header version 21, a size 22, the number of FW 23, and FW properties 24A to 24C. The header version 21 indicates a version of the archive file 2. The size 22 indicates a size of the archive file 2. The archive file size 22 is expressed, for example, by the number of sectors indicating, for example, 512 bytes. The number of FW 23 indicates the number of pieces of firmware 2A to 2C included in the archive file 2. In the example of FIG. 3, the number of FW 23 is set to "3".

The number of FW properties 24A to 24C coincides with the number of pieces of firmware 2A to 2C. The FW properties 24A to 24C are first information for identifying the firmware 2A to the firmware 2C. The FW property 24A indicates the property of the firmware 2A. The FW property 24B indicates the property of the firmware 2B. The FW property 24C indicates the property of the firmware 2C.

The FW property 24A includes an offset value 25, a size 26, customer customization information 27, and hardware information 28. The offset value 25 indicates a top position of the firmware 2A as an offset value from the top of the archive file 2. The size 26 indicates a size (for example, the number of sectors) of the firmware 2A. The offset value 25 and the size 26 form second information indicating the position on the archive file 2 of the corresponding firmware 2A of the plurality of firmware 2A to 2C. The customer customization information 27 indicates model information of the memory system 100, to which the firmware 2A is applied. The hardware information 28 indicates hardware information of respective constituent elements such as the NAND 30 and the controller 50 configuring the memory system 100. The hardware information 28 includes the type of the NAND 30, the memory capacity of the NAND 30, and the type of processor configuring the controller 50. The FW properties 24B and 24C have the same configuration as that of the FW property 24A.

The customer customization information 27 and the hardware information 28 included in the respective FW properties 24A to 24C include unique information for identifying the plurality of firmware 2A to 2C included in the archive file 2. The customer customization information 27 and the hardware information 28 include information indicating an applicable device of the plurality of firmware 2A to 2C included in the archive file 2. The information indicating the applicable device includes information indicating, for example, the model of the memory system and the memory capacity of the NAND 30. The information indicating the applicable device is utilized for collation with device information of the memory system 100 at the time of update of the firmware.

The firmware 2A to the firmware 2C are firmware bodies for update.

Figure 4:
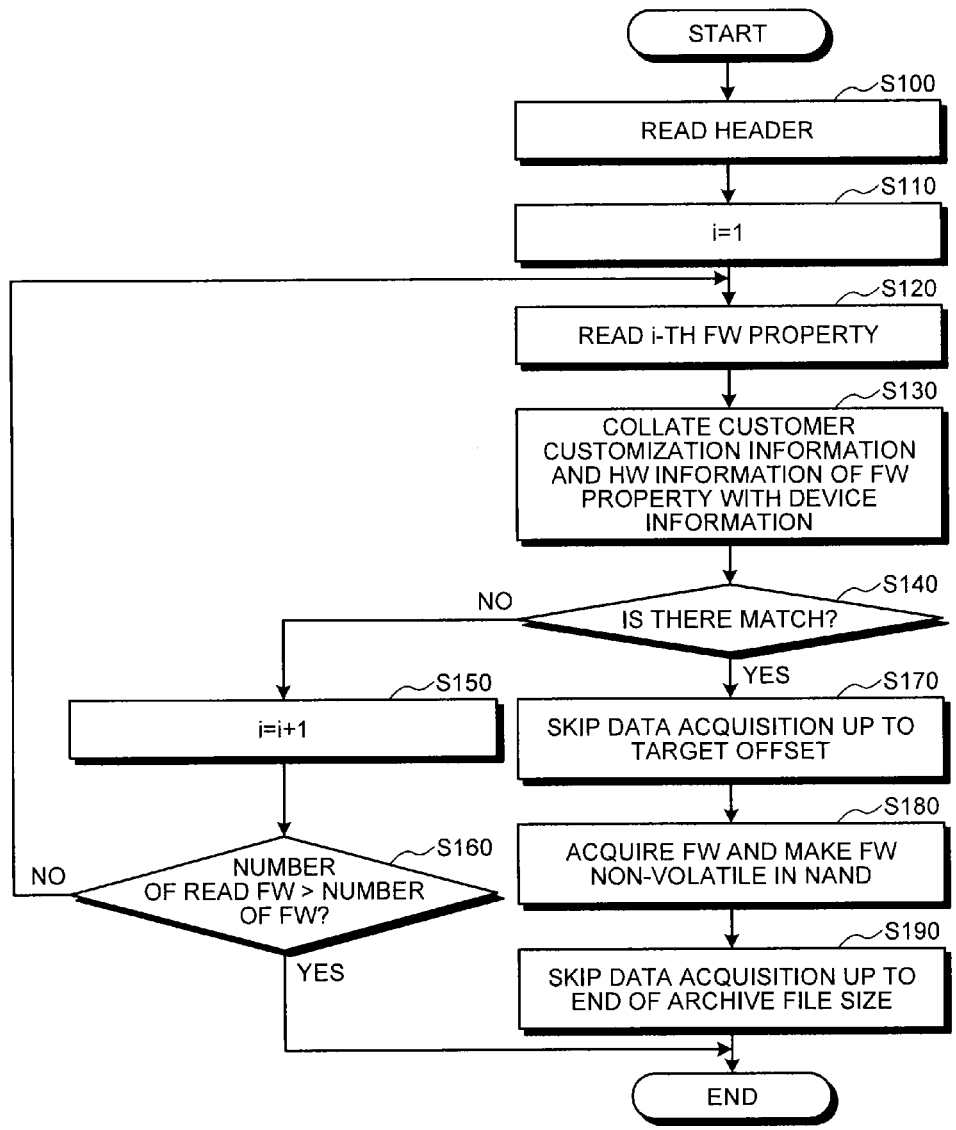
FIG. 4 is a flowchart for explaining an update process of firmware according to the first embodiment.

FIG. 4 illustrates an update process of the firmware performed by the controller 50 of the memory system 100. The host 1 transmits a firmware update command (for example, DOWNLOAD MICROCODE defined in the ATA standard) and the archive file 2 to the memory system 100 that performs update of the firmware. Accordingly, the memory system 100 receives the firmware update command and also receives the archive file 2 in the order of the header 2h and the firmware 2A to the firmware 2C.

Upon reception of the firmware update command from the host 1, the controller 50 first reads the header 2h of the archive file 2, and places the header 2h on the RAM 40 (Step S100). The controller 50 then sets i=1 (Step S110) and reads the i(=1)th FW property 24A (Step S120). The controller 50 collates the customer customization information 27 and the hardware information 28 of the FW property 24A with the device information of the memory system 100 (Step S130). The device information of the memory system 100 is stored in the NAND 30 or a ROM (not shown). Device information in a unit of memory system is registered in the device information. The device information is registered by a manufacturer in the production stage of the memory system 100. The device information includes instrument information of the memory system 100 including information indicating the model of the memory system and the memory capacity of the NAND 30. In this way the device information of the memory system 100 is a information for identifying the memory system 100.

When there is no match in a collation process (NO at Step S140), the controller 50 increments i by 1 (Step S150). The controller 50 determines whether the number of FW properties read from the archive file 2 exceeds a set value of the number of FW 23 in the header 2h (Step S160). When the determination result is YES, the controller 50 finishes the update process of the firmware. When the determination result is NO, the controller 50 reads the second FW property 24B (Step S120), and performs the collation process at Step S130 with respect to the second FW property 24B. In this manner, the controller 50 repeats the processes at Steps S120 to S160 until there is a match in the collation process at Step S140.

When there is a match in the collation process at Step S140, the controller 50 identifies the top position and the size of the firmware to be acquired, based on the offset value 25 and the size 26 included in the FW property in which there is a match in the collation process. The controller 50 acquires only the firmware required for update from the data string in the archive file 2 transferred from the host 1, based on the offset value 25 and the size 26 of the identified firmware, and stores the firmware in the storage region of the RAM 40 (Steps S170 to S190). That is, the controller 50 acquires a position on the archive file 2 of a portion required for update of the firmware of the memory system 100 of its own based on the offset value 25 and the size 26 of the firmware property. The controller 50 skips data acquisition of the portion until reaching the offset value 25. Furthermore, the controller 50 acquires a portion following the portion required for update of the firmware based on the archive file size 22 of the header 2h, to skip data acquisition until the end of the archive file size. In other words, the controller 50 stores only the portion required for update of the firmware of the received archive file in the RAM 40, and discards other portions without storing the other portions. The controller 50 stores the portion required for update of the firmware, which is temporarily stored in the RAM 40, in a predetermined region of the region of the NAND 30 where the firmware 31 is stored to make the portion non-volatile.

Figure 5:
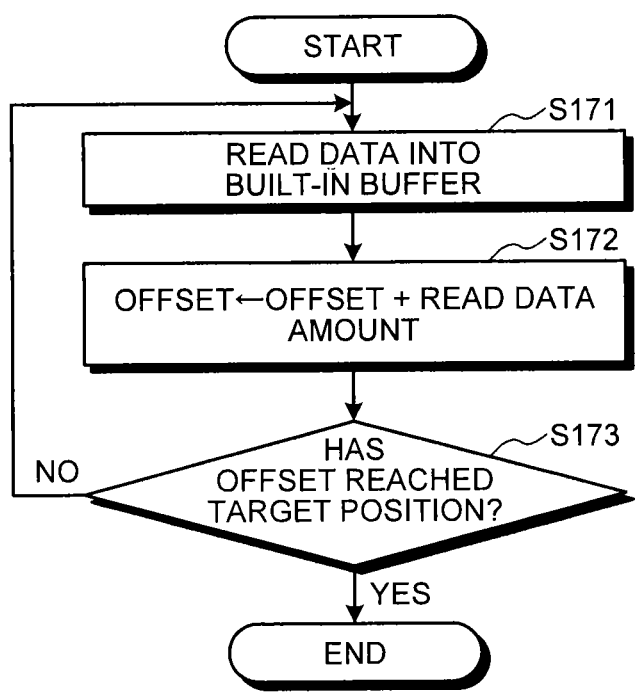
FIG. 5 is a flowchart for explaining a data skip process according to the first embodiment.

FIG. 5 is a flowchart for explaining details of a skip operation at Step S170 or S190 in FIG. 4. The host interface 10 stores the data received from the host 1 in a built-in buffer (not shown) in the host interface 10 (Step S171). The controller 50 adds an offset by the stored data amount (Step S172). The controller 50 determines whether the offset has reached a target offset value (Step S173), and if the offset has not reached the target offset value, reads data again into the built-in buffer (Step S171). If the offset value has reached the target offset value, the controller 50 finishes the skip operation of data acquisition. The target offset value is, for example, the offset value 25 of the firmware property, or an offset value corresponding to the end of the archive file 2. In this manner, in the operation of skipping data acquisition, the data is stored only in the built-in buffer of the host interface 10 and is not stored in the storage region of the RAM 40.

Figure 6:
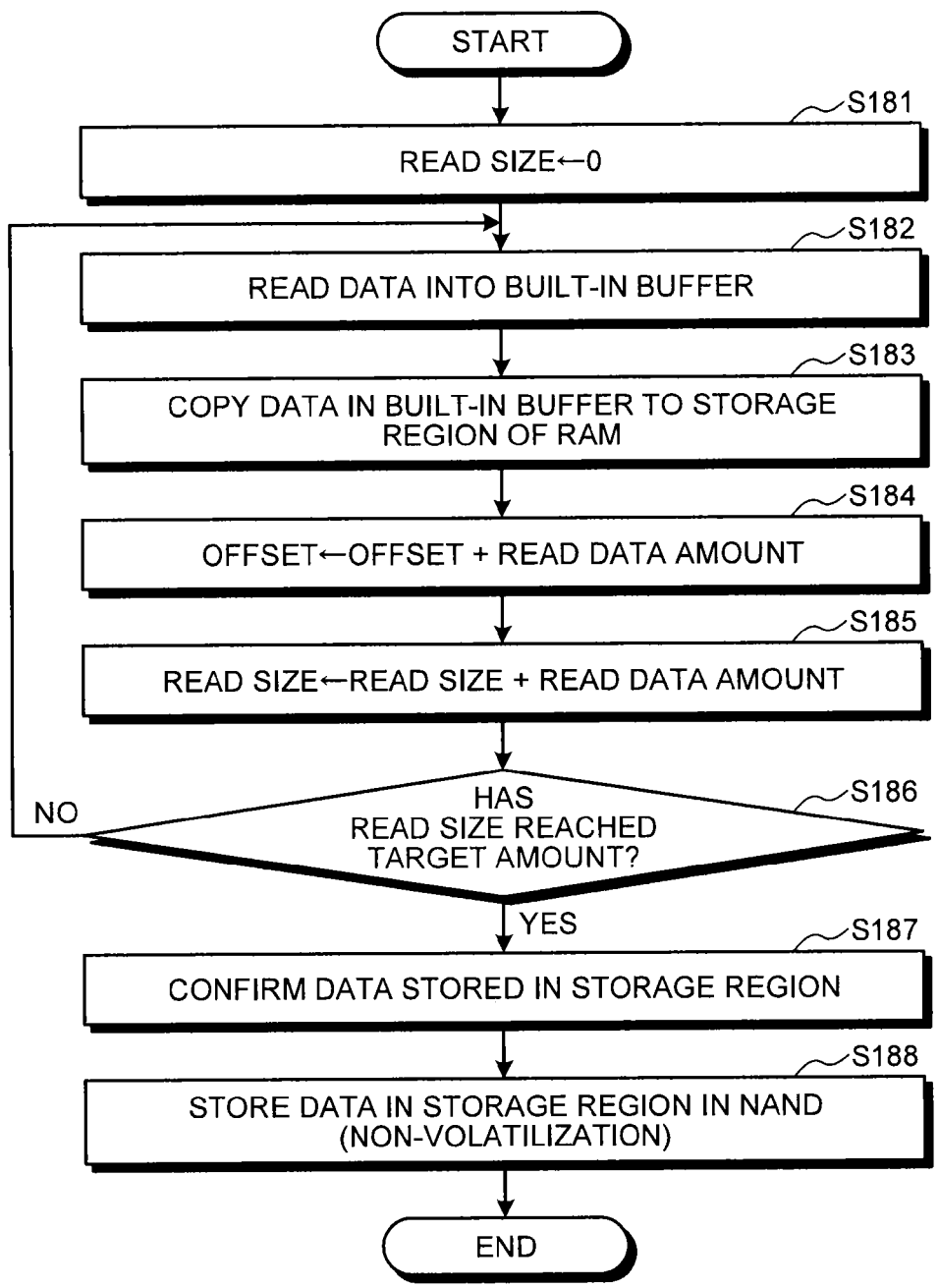
FIG. 6 is a flowchart for explaining a firmware acquisition process and a non-volatilization process according to the first embodiment.

FIG. 6 is a flowchart for explaining in detail an acquisition process of the firmware and a non-volatilization process to the NAND 30. The flowchart in FIG. 6 shows an operation when the data string received from the host 1 has reached the updated firmware portion in the archive file 2.

The controller 50 sets a read size, being a counter of the read data amount, to zero prior to the operation of acquiring the firmware (Step S181). Thereafter, the host interface 10 stores the data of the updated firmware portion received from the host 1 in the built-in buffer in the host interface 10 (Step S182). Subsequently, the controller 50 copies the data in the built-in buffer to the storage region of the RAM 40 (Step S183). The controller 50 also adds the read data amount to both the offset and the read size (Steps S184, S185). Subsequently, the controller 50 checks whether the read size has reached a target amount specified by the size 26 (Step S186). If the read size has not reached the target amount, the host interface 10 receives data of the updated firmware portion from the host 1 and stores the data in the built-in buffer (Step S182).

When the read size has reached the target amount specified by the size 26, the controller 50 confirms the data stored in the storage region (Step S187). In this confirmation, it is confirmed whether the data is broken and whether the firmware that can be written in the memory system 100 has been read. That is, the firmware 2A to the firmware 2C include the customer customization information 27 and the hardware information 28, and the controller 50 collates the customer customization information 27 and the hardware information 28 included in the read firmware with the device information of the memory system 100, thereby performing reconfirmation. The controller 50 then stores the data in the storage region of the RAM 40 in a region of the FW 31 in the NAND 30, thereby making the updated firmware non-volatile (Step S188). Update of the firmware is performed in this manner.

An operation of the controller 50 to acquire the firmware 2B of the firmware 2A to the firmware 2C is explained as an example. At Step S100, the controller 50 reads the header 2h of the archive file 2. The data of the header 2h is placed in a region (not shown) on the RAM 40. At Steps S110 to S140, the controller 50 picks up the FW property in the header 2h one by one to collate the customer customization information 27 and the hardware information 28 thereof with the device information of the memory system 100. As a result, the customer customization information 27 and the hardware information 28 of the FW property 24B matches the device information of the memory system 100.

At Step S170, the controller 50 acquires the offset value 25 of the firmware property 24B and skips data acquisition up to the position thereof. At this time, because read of the header portion has finished at Step S100, the portion corresponding to the firmware 2A of the archive file 2 is skipped. The controller 50 acquires the firmware 2B at the next Step S180. The controller 50 knows the size of the firmware 2B by acquiring the size 26 of the FW property 24B, and acquires the data string from the host interface 10 by the amount of the size to copy the data string to the storage region of the RAM 40. Furthermore, the controller 50 confirms the data in the storage region of the RAM 40 and then stores the data in the storage region of the RAM 40 in the region of the FW 31 in the NAND 30.

At Step S190, the controller 50 skips data acquisition up to the end of the size of the archive file 2. The controller 50 reads the archive file size 22 in the header 2h, and skips data acquisition until the offset reaches the value. In this example, only the firmware 2C is included from the end of the firmware 2B to the end of the archive file 2. Accordingly, the portion of the firmware 2C is skipped.

In this manner, the controller 50 skips the firmware 2A and the firmware 2C without storing these pieces of firmware in the RAM 40, and operates to store only the firmware 2B to be made non-volatile in the storage region of the RAM 40.

Figure 7:
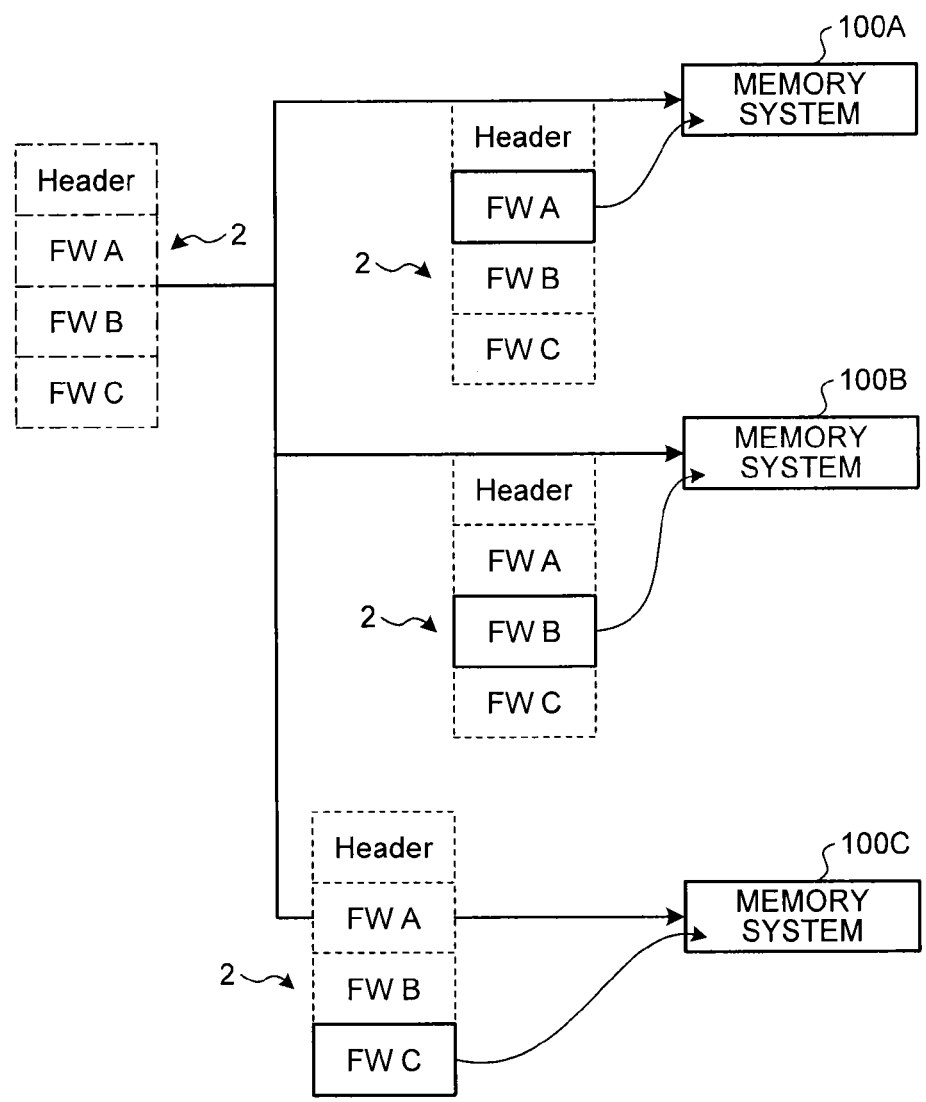
FIG. 7 conceptually illustrates update of the firmware according to the first embodiment.

FIG. 7 exemplifies a result of update of the firmware in three memory systems 100A to 100C by using the archive file 2 including the plurality of firmware 2A to 2C. The archive file 2 indicated by a one-dot-chain line is input to each of the memory systems 100A to 100C. A solid-lined portion in the archive file 2 on the right side in FIG. 7 illustrates firmware to be acquired in each of the memory systems 100A to 100C, and a broken-lined portion indicates the firmware, which is not acquired and is discarded. In the memory system 100A, update is performed by using the firmware 2A, and the firmware 2B and the firmware 2C are discarded. In the memory system 100B, update is performed by using the firmware 2B, and the firmware 2A and the firmware 2C are discarded. In the memory system 100C, update is performed by using the firmware 2C, and the firmware 2A and the firmware 2B are discarded.

According to the memory system of the first embodiment, the memory system performs update of the firmware by extracting the firmware adapted to the memory system itself from the archive file including a plurality of firmware, and does not store the firmware not adapted to the memory system itself. Therefore, one archive file can be applied to variations of multiple use applications, usage environments, or coupling parts, thereby improving the work efficiency. Furthermore, because read of an unrequired portion of the archive file is skipped, the update process of the firmware can be performed efficiently.

(Second Embodiment)

Figure 8:
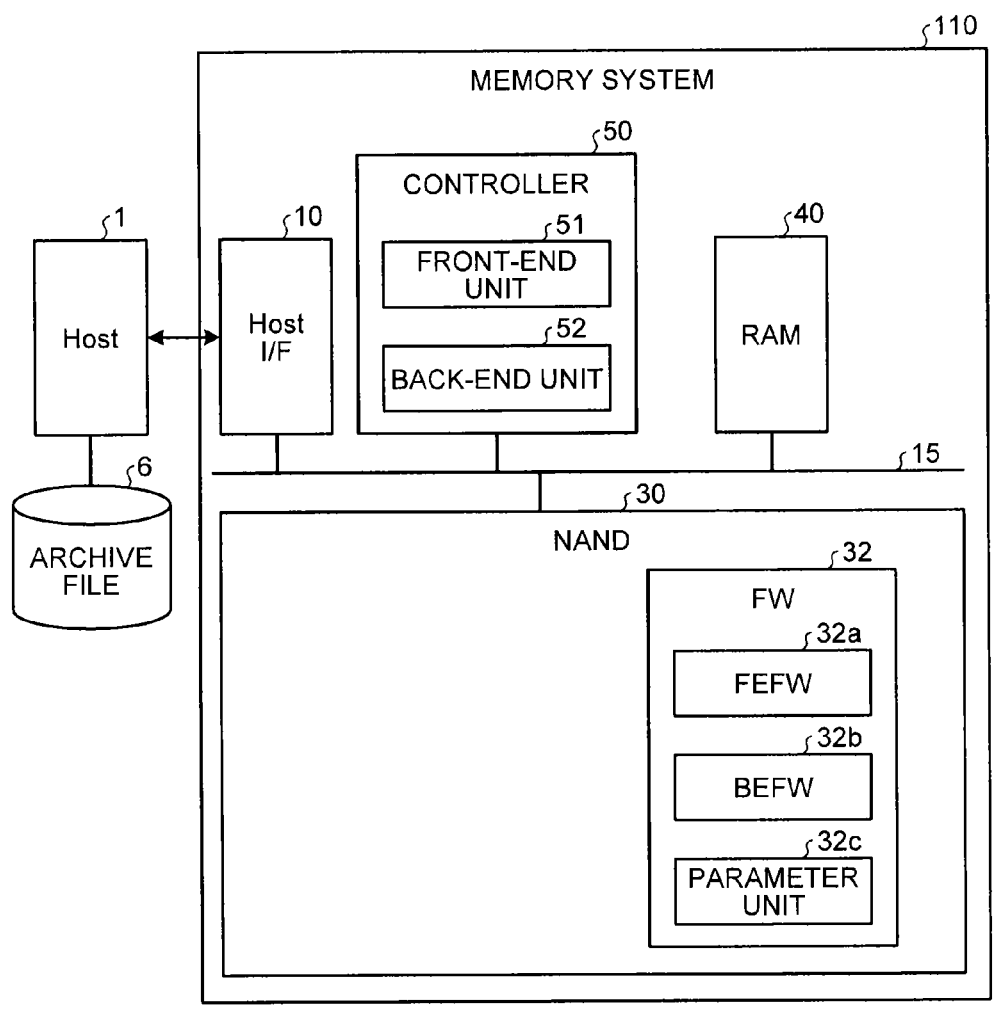
FIG. 8 is a functional block diagram illustrating an internal configuration of a memory system according to a second embodiment.

FIG. 8 is a block diagram illustrating a configuration example of a memory system 110 according to a second embodiment. The memory system 110 includes the host interface 10, the NAND 30, the RAM 40, and the controller 50 as in the first embodiment. In the second embodiment, the controller 50 includes a front-end unit 51 and a back-end unit 52. The RAM 40 includes a storage region for temporarily storing the firmware to be updated.

Firmware 32 stored in the NAND 30 includes a plurality of functional components. In the present embodiment, the firmware 32 includes three components of a front-end FW unit 32a, a back-end FW unit 32b, and a parameter unit 32c.

The front-end unit 51 controls the host interface 10 to control communication with the host 1. The function of the front-end unit 51 is realized by the processor by executing the front-end FW unit 32a of the firmware 32. The front-end unit 51 receives a command from the host interface 10 and transfers the command to the back-end unit 52. The front-end unit 51 also transfers data between the host 1 and the RAM 40 in cooperation with the back-end unit 52.

The back-end unit 52 has a function of executing the command acquired from the front-end unit 51. The function of the back-end unit 52 is realized by the processor by executing the back-end FW unit 32b of the firmware 32. The back-end unit 52 manages the user data and controls read, write, and erasure operations with respect to the NAND 30. The back-end unit 52 transfers data between the RAM 40 and the NAND 30. The processes performed by the back-end unit 52 include data write to the NAND 30, data read from the NAND 30, update of the management information, control of non-volatilization, and garbage collection with respect to the NAND 30. The front-end unit 51 and the back-end unit 52 can be configured by one processor, or can be configured by separate processors.

Various parameters for determining the operation of the memory system 110 are stored in the parameter unit 32c. The parameter includes, for example, a valid/invalid flag of the function requested by a specified customer, the presence of encryption of the user data, and other various pieces of information. At the time of an operation of the front-end unit 51 and the back-end unit 52, the front-end unit 51 and the back-end unit 52 refer to the various parameters in the region in the RAM 40 to which the parameter unit 32c or a part thereof is copied.

The update process of the firmware of the memory system 110 according to the second embodiment is explained next. FIG. 9 illustrates a data format of an archive file 6 according to the second embodiment. In FIG. 9, an example of names and values of respective fields included in a header 6h is shown. The archive file 6 is one binary data string. The archive file 6 includes the header 6h, a parameter unit 6P, a front-end unit 6F, and a back-end unit 6B.

A body part of the firmware is shown in FIG. 10. A firmware body is formed of a plurality of functional components in the archive file 6. In the example, the firmware body is divided into three parts of the parameter unit 6P, the front-end unit 6F, and the back-end unit 6B.

As shown in FIG. 10, the parameter unit 6P includes four parameters 6P0 to 6P3 having numbers of 0 to 3. The front-end unit 6F includes one front-end FW unit 6F0 having the number 0. The back-end unit 6B includes two back-end FW units 6B0 and 6B1 having the numbers 0 and 1, respectively. In FIG. 10, numerical values shown on the right side represent offset values from the top of the archive file 6 of the respective components.

As shown in FIG. 9, the header 6h includes a header version 61, an archive file size 62, the number of FW 63, and FW properties 64A to 64C. The header 6h has a fixed length. The header version 61 indicates a version of the archive file 6. The archive file size 62 indicates the size of the archive file 6. The size 62 is expressed, for example, by the number of sectors. The number of FW 63 indicates the number of pieces of firmware included in the archive file 6. In the example, the number of FW 63 is "4".

The number of FW properties 64A to 64D coincides with the number of pieces of firmware included in the archive file 6. The FW properties 64A to 64D are first information for identifying first firmware FW1 to fourth firmware FW4. The FW property 64A indicates the property of the first firmware FW1. The FW property 64B indicates the property of the second firmware FW2. The FW property 64C indicates the property of the third firmware FW3. The FW property 64D indicates the property of the fourth firmware FW4.

The FW property 64A includes a parameter-unit offset value 71, a parameter unit size 72, a front-end-unit offset value 73, a front-end unit size 74, a back-end-unit offset value 75, a back-end unit size 76, customer customization information 77, and hardware information 78. The parameter-unit offset value 71, the parameter unit size 72, the front-end-unit offset value 73, the front-end unit size 74, the back-end-unit offset value 75, and the back-end unit size 76 form second information indicating the respective positions on the archive file 6 of a plurality of components 6P0, 6F0, and 6B0 included in the corresponding firmware FW1 of the plurality of firmware FW1 to FW4.

The parameter-unit offset value 71 and the parameter unit size 72 indicate position information of the parameter unit included in the first firmware FW1. The parameter-unit offset value 71 indicates a top position of the parameter unit 6P0 having the number 0 as an offset value from the top of the archive file 6. The parameter unit size 72 indicates the size of the parameter unit 6P0.

The front-end-unit offset value 73 and the front-end unit size 74 indicate position information of the front-end unit included in the first firmware FW1. The front-end-unit offset value 73 indicates a top position of the front-end FW unit 6F0 having the number 0 as an offset value from the top of the archive file 6. The front-end unit size 74 indicates the size of the front-end FW unit 6F0.

The back-end-unit offset value 75 and the back-end unit size 76 indicate position information of the back-end unit included in the first firmware FW1. The back-end-unit offset value 75 indicates a top position of the back-end FW unit 6B0 having the number 0 as an offset value from the top of the archive file 6. The back-end unit size 76 indicates the size of the back-end FW unit 630.

The customer customization information 77 indicates model information of the memory system 110, to which the first firmware FW1 is applied. The hardware information 78 indicates hardware information of respective constituent elements such as the NAND 30 and the controller 50 included in the memory system 110. The hardware information 78 includes the type of the NAND 30, the memory capacity of the NAND 30, and the type of a processor configuring the controller 50.

As described above, according to the FW property 64A, it is shown that the first firmware FW1 is configured by the parameter unit 6P0 having the number 0, the front-end FW unit 6F0 having the number 0, and the back-end FW unit 6B0 having the number 0.

The FW properties 64B, 64C, and 64D have the same configuration as that of the FW property 64A. According to the FW property 64B, it is shown that the second firmware FW2 is configured by the parameter unit 6P1 having the number 1, the front-end FW unit 6F0 having the number 0, and the back-end FW unit 6B1 having the number 1. According to the FW property 64C, it is shown that the third firmware FW3 is configured by the parameter unit 6P2 having the number 2, the front-end FW unit 6F0 having the number 0, and the back-end FW unit 6B1 having the number 1. According to the FW property 64D, it is shown that the fourth firmware FW4 is configured by the parameter unit 6P3 having the number 3, the front-end FW unit 6F0 having the number 0, and the back-end FW unit 6B1 having the number 1.

The customer customization information 77 and the hardware information 78 included in the respective FW properties 64A to 64D includes third information, which is unique information for identifying the plurality of firmware configured by the respective components included in the archive file 6. The customer customization information 77 and the hardware information 78 include information indicating an applicable device of the plurality of firmware included in the archive file 6. The information indicating the applicable device includes information indicating, for example, the model of the memory system and the memory capacity of the NAND 30. The information indicating the applicable device is utilized for collation with the device information of the memory system 110 at the time of update of the firmware.

Figure 11:
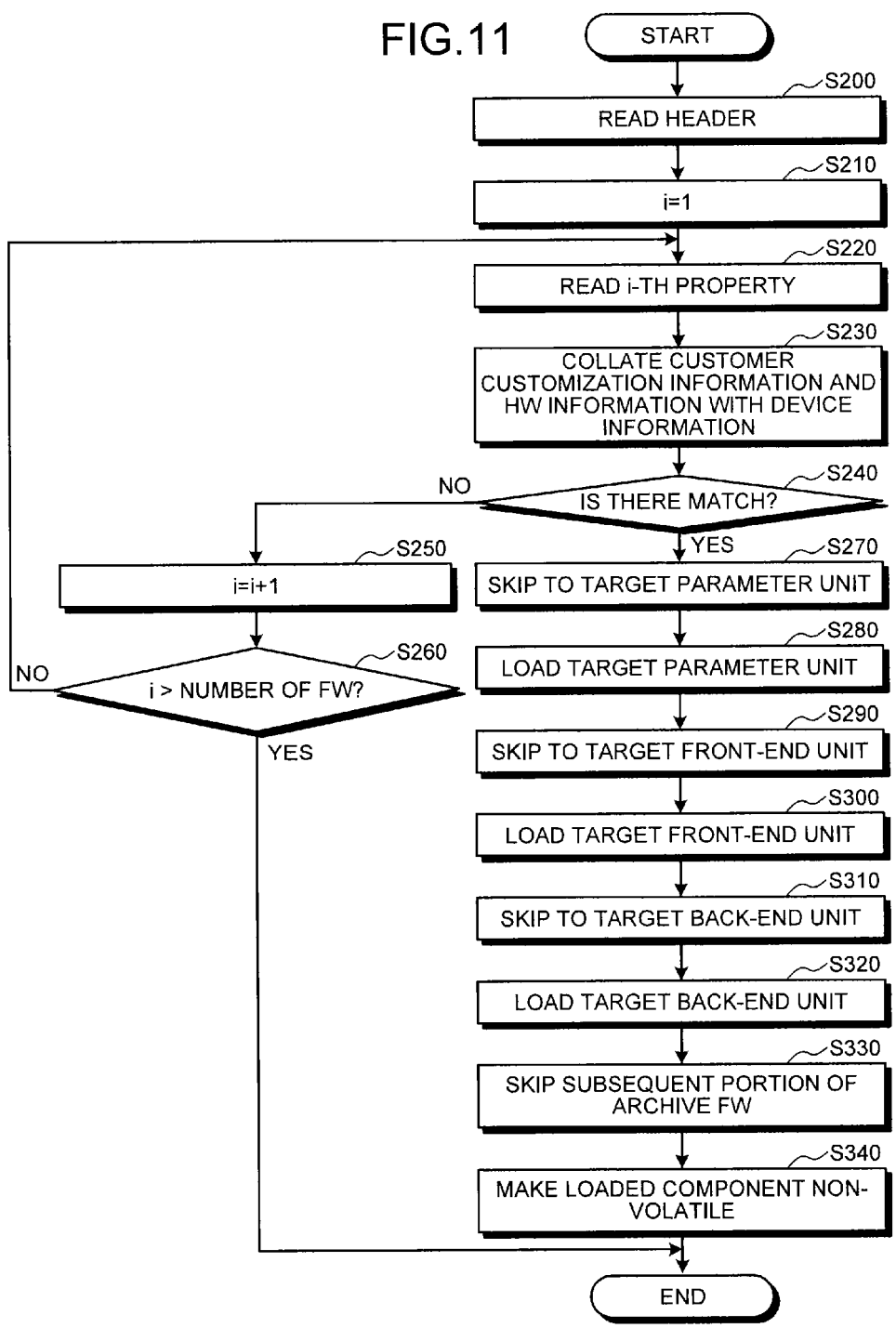
FIG. 11 is a flowchart illustrating an update process of the firmware according to the second embodiment.

FIG. 11 illustrates an update process of the firmware performed by the controller 50 of the memory system 110. The host 1 transmits a firmware update command (for example, DOWNLOAD MICROCODE) and the archive file 6 to the memory system 110 that performs update of the firmware, similarly to the above embodiment. Accordingly, the memory system 110 receives the firmware update command and also receives the archive file 6 in the order of the header 6h, the parameter unit 6P, the front-end unit 6F, and the back-end unit 6B.

Upon reception of the firmware update command from the host 1 via the host interface 10, the controller 50 first reads the header 6h of the archive file 6, and places the header 6h on the RAM 40 (Step S200). The controller 50 then sets i=1 (Step S210) and reads the i(=1)th FW property 64A (Step S220). The controller 50 collates the customer customization information 77 and the hardware information 78 of the FW property 64A with the device information of the memory system 110 (Step S230).

When there is no match in the collation process (NO at Step S240), the controller 50 increments i by 1 (Step S250). The controller 50 determines whether the number of FW properties read from the archive file 6 exceeds a set value of the number of FW 63 in the header 6h (Step S260). When the determination result is YES, the controller 50 finishes the update process of the firmware. When the determination result at Step S260 is NO, the controller 50 reads the second FW property 64B (Step S220), and performs the collation process at Step S230 with respect to the second FW property 64B. In this manner, the controller 50 repeats the process at Steps S220 to S260 until there is a match in the collation process at Step S240.

When there is a match in the collation process at Step S240, the controller 50 identifies the component to be acquired and the top position and the size of the respective components, based on the pieces of position information 71 to 76 of the respective components included in the FW property in which there is a match in the collation process. The controller 50 acquires only the component required for update from the data string in the archive file 6 transferred from the host 1, based on the offset value and the size of the identified components, and loads the component in the storage region of the RAM 40 (Steps S270 to S330). The controller 50 stores the firmware, which is lastly loaded in the storage region of the RAM 40, in a region of the firmware 32 in the NAND 30, thereby making the updated firmware non-volatile (Step S340). That is, the controller 50 skips acquisition of a component portion, which is not required for update of the firmware of the memory system 110 of its own, as in the first embodiment. In other words, the controller 50 loads only the component required for update of the firmware in the storage region of the RAM 40, and discards other components without loading the other components in the RAM 40. The operations at Steps S270, S290, S310, and S330 in which unrequired portions are skipped are performed by the method of the first embodiment shown in FIG. 5. The operations at Steps S280, S300, and S320 in which the respective portions are loaded are performed by the method of the first embodiment shown in FIG. 6. However, confirmation of data in the storage region at Step S187 is performed only with respect to the respective components loaded in the RAM 40 at that time. Non-volatilization shown at Step S188 is not performed, and is collectively performed at Step S340 in FIG. 11.

For example, in FIG. 9, when the customer customization information 77 and the hardware information 78 of the third firmware FW3 match the device information of the memory system 110, the position information of the respective components described below is acquired. The position information of the respective components to be acquired includes the parameter-unit offset value=24, the parameter size=8, the front-end-unit offset value=40, the front-end unit size=256, the back-end-unit offset value=596, and the back-end unit size=312.

First, the controller 50 skips from the top of the archive file 6 to the position having the offset value "24" (Step S270). The controller 50 acquires data having the size "8" from the position having the offset value "24", and loads the data in the storage region of the RAM 40. Accordingly, the parameter unit having the number "3" is loaded in the storage region of the RAM 40 (Step S280).

The controller 50 skips from the top of the archive file 6 to a position having the offset value "40" (Step S290). The controller 50 acquires data having the size "256" from the position having the offset value "40", and loads the data in the storage region of the RAM 40. Accordingly, the front-end unit having the number "0" is loaded in the storage region of the RAM 40 (Step S300).

The controller 50 skips to a position having the offset value "596" from the top of the archive file 6 (Step S310). The controller 50 acquires data having the size "312" from the position having the offset value "596", and loads the data in the storage region of the RAM 40. Accordingly, the back-end unit having the number "1" is loaded in the storage region of the RAM 40 (Step S320). When there are more pieces of data thereafter, acquisition of the subsequent portion of data is skipped and the data is discarded (Step S330).

The controller 50 stores the respective components, which configure the updated firmware and are temporarily stored in the storage region of the RAM 40, in a predetermined region of the NAND 30, and makes the components non-volatile. The respective components of the firmware are updated in this way (Step S340).

According to the memory system of the second embodiment, a plurality of components that configure a plurality of updated firmware are stored in the archive file 6 for each function. Therefore, it is not required to store the common components between the plurality of updated firmware in an overlapped manner. Therefore, the size of the firmware in an archive format is further reduced.

In the above explanations, the functional components included in the firmware are divided into three parts of the parameter unit, the front-end unit, and the back-end unit. However, the functional components can be divided into two parts of the front-end unit and the back-end unit. Furthermore, the functional components can be divided into two parts of the parameter unit and the firmware body. The functional components can be divided into other functional components.

(Third Embodiment)

In the first and second embodiments, the memory system uses the device information registered in a unit of memory system to perform the collation process with the archive FW. In the memory system according to a third embodiment, a unique component ID is provided to each unit of component configuring the firmware. Accordingly, in the memory system according to the third embodiment, when the firmware includes three components of the parameter unit, the front-end unit, and the back-end unit, a unique component ID is registered for each of the parameter unit, the front-end unit, and the back-end unit. In the following descriptions, the memory system 110 shown in FIG. 8 is explained as a memory system to which the third embodiment is applied.

Figure 12:
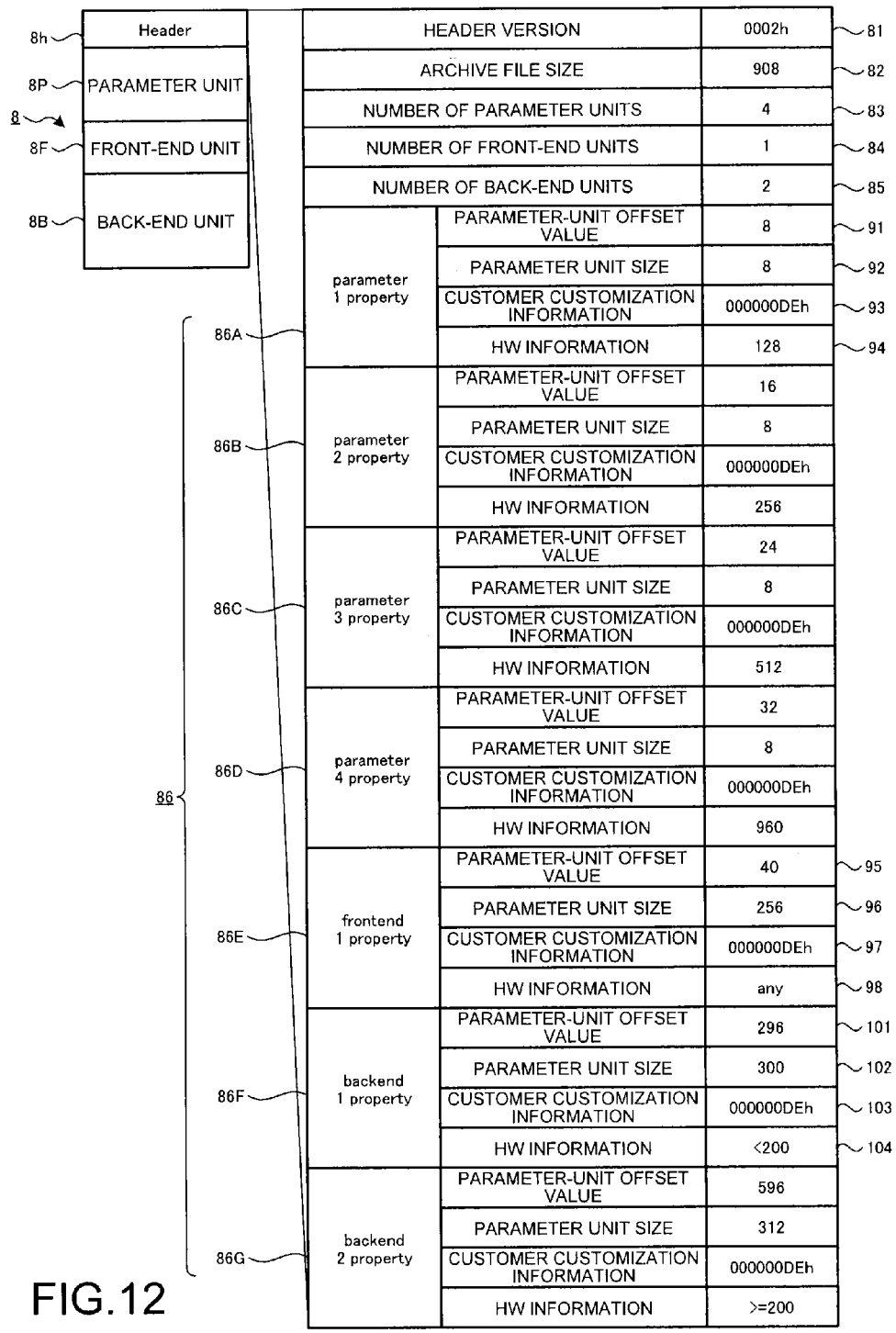
FIG. 12 illustrates a format of a header of a firmware image in an archive format according to a third embodiment.

FIG. 12 illustrates a data format of an archive file 8 according to the third embodiment. The archive file 8 is one binary data string. The archive file 8 includes a header 8*h*, a parameter unit 8P, a front-end unit 8F, and a back-end unit 8B.

Figure 13:
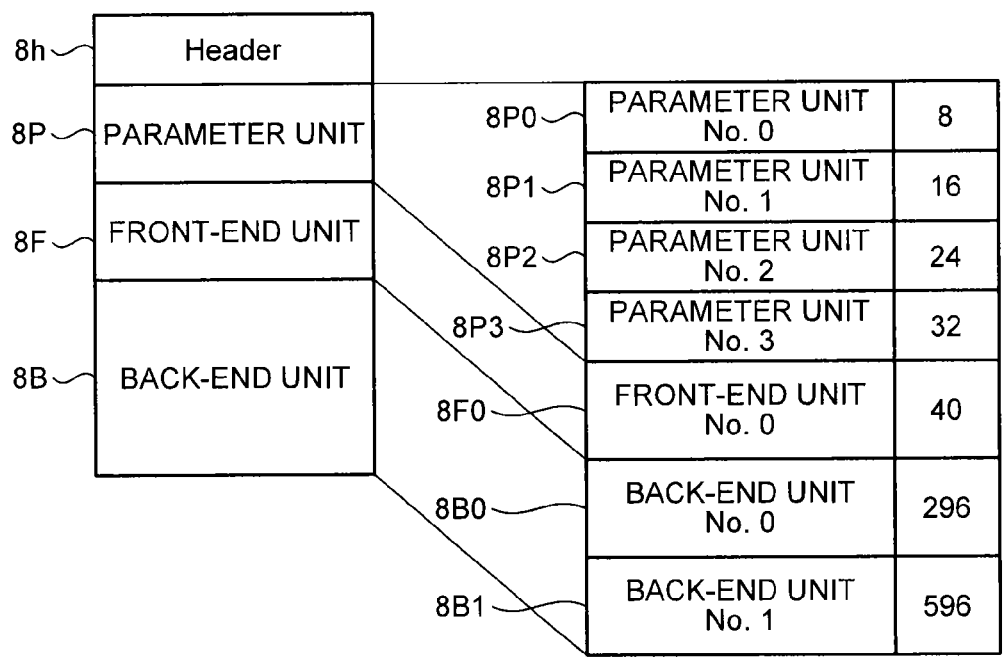
FIG. 13 illustrates a format of a firmware body of the firmware image in an archive format according to the third embodiment.

FIG. 13 illustrates a body part of the firmware. In the archive file 8, the firmware body includes a plurality of functional components. In the example, the firmware body is divided into three parts of the parameter unit 8P, the front-end unit 8F, and the back-end unit 8B, as in FIG. 10.

As shown in FIG. 13, the parameter unit 8P includes four parameters 8P0 to 8P3 respectively having the number 0 to the number 3. The front-end unit 8F includes one front-end FW unit 8F0 having the number 0. The back-end unit 8B includes two back-end FW units 8B0 and 8B1 having the numbers 0 and 1, respectively. In FIG. 13, numerical values shown on the right side indicate offset values from the top of the archive file 8 of the respective components.

As shown in FIG. 12, the header 8*h* includes a header version 81, an archive file size 82, the number of parameter units 83, the number of front-end units 84, the number of back-end units 85, and component property 86. The header 8*h* has a fixed length. The header version 81 indicates a version of the archive file 8. The archive file size 82 indicates the size of the archive file 8.

The number of parameter units 83 indicates the number of parameter units included in the archive file 8. In the example, because the parameter unit 8P includes four parameter units, the number of parameter units 83 is "4". The number of front-end units 84 indicates the number of front-end FW units included in the archive file 8. In the example, because the front-end unit 8F includes one front-end FW unit, the number of front-end units 84 is "1". The number of back-end units 85 indicates the number of back-end FW units included in the archive file 8. In the example, because the back-end unit 8B includes two back-end FW units, the number of back-end units 85 is "2".

The component property 86 indicates properties of the respective components included in the archive file 8. The component property 86 includes a plurality of first information for identifying the respective components included in the archive file 8. The component property 86 includes component properties 86A to 86D of the number corresponding to the number of parameters 8P0 to 8P3 included in the parameter unit 8P. The component property 86 includes a component property 86E of the number corresponding to the number of the front-end FW unit 8F0 included in the front-end unit 8F. The component property 86 includes component properties 86F to 86G of the number corresponding to the number of back-end FW units 8B0 and 8B1 included in the back-end unit 8B.

The property 86A indicates the property of the parameter 8P0, and includes a parameter-unit offset value 91, a parameter unit size 92, customer customization information 93, and hardware information 94. The parameter-unit offset value 91 and the parameter unit size 92 form second information indicating the position information of the first parameter. The parameter-unit offset value 91 indicates a top position of the parameter 8P0 having the number 0 as an offset value from the top of the archive file 8. The parameter unit size 92 indicates the size of the parameter 8P0. The customer customization information 93 indicates model information of the memory system 110, to which the parameter 8P0 is applied. The hardware information 94 indicates hardware information of respective constituent elements such as the NAND 30 and the controller 50 included in the memory system 110, to which the parameter 8P0 is applied. The hardware information 94 includes the type of the NAND 30, the memory capacity of the NAND 30, and the type of a processor configuring the controller 50.

The customer customization information 93 and the hardware information 94 included in the property 86A include unique information for identifying the parameter 8P0. The customer customization information 93 and the hardware information 94 include information indicating an applicable device of the parameter 8P0. The information indicating the applicable device includes information indicating, for example, the model of the memory system and the memory capacity of the NAND 30. The information indicating the applicable device is utilized for collation with the component ID of the memory system 110 at the time of update of the firmware.

The properties 86B to 86D respectively indicate the property of the parameters 8P1 to 8P3, and have the same configuration as that of the property 86A.

The property 86E indicates the property of the front-end FW unit 8F0, and includes a front-end-unit offset value 95, a front-end unit size 96, customer customization information 97, and hardware information 98. The front-end-unit offset value 95 and the front-end unit size 96 form second information indicating the position information of the front-end FW unit 8F0. The front-end-unit offset value 95 indicates a top position of the front-end FW unit 8F0 as an offset value from the top of the archive file 8. The front-end unit size 96 indicates the size of the front-end FW unit 8F0.

The customer customization information 97 indicates the model information of the memory system 110, to which the front-end FW unit 8F0 is applied. The hardware information 98 indicates the hardware information of the respective constituent elements such as the NAND 30 and the controller 50 included in the memory system 110, to which the front-end FW unit 8F0 is applied. The hardware information 98 includes the type of the NAND 30, the memory capacity of the NAND 30, and the type of the processor configuring the controller 50. The customer customization information 97 and the hardware information 98 include unique information for identifying the front-end FW unit 8F0. The customer customization information 97 and the hardware information 98 include information indicating an applicable device of the front-end FW unit 8F0. The information indicating the applicable device includes information indicating, for example, the model of the memory system and the memory capacity of the NAND 30. The information indicating the applicable device is utilized for collation with the component ID of the memory system 110 at the time of update of the firmware.

The property 86F indicates the property of the back-end FW unit 8B0, and includes a back-end-unit offset value 101, a back-end unit size 102, customer customization information 103, and hardware information 104. The back-end-unit offset value 101 and the back-end unit size 102 form second information indicating the position information of the back-end FW unit 8B0. The back-end-unit offset value 101 indicates a top position of the back-end FW unit 8B0 as an offset value from the top of the archive file 8. The back-end unit size 102 indicates the size of the back-end FW unit 8B0.

The customer customization information 103 indicates the model information of the memory system 110, to which the back-end FW unit 8B0 is applied. The hardware information 104 indicates the hardware information of the respective constituent elements such as the NAND 30 and the controller 50 included in the memory system 110, to which the back-end FW unit 8B0 is applied. The hardware information 104 includes the type of the NAND 30, the memory capacity of the NAND 30, and the type of the processor configuring the controller 50. The customer customization information 103 and the hardware information 104 include unique information for identifying the back-end FW unit 8B0. The customer customization information 103 and the hardware information 104 include information indicating an applicable device of the back-end FW unit 8B0. The information indicating the applicable device includes information indicating, for example, the model of the memory system and the memory capacity of the NAND 30. The information indicating the applicable device is utilized for collation with the component ID of the memory system 110 at the time of update of the firmware.

The property 86G indicates the property of the back-end FW unit 8B1, and has the same configuration as that of the property 86F.

In this manner, in the archive file 8 according to the third embodiment, as in the second embodiment, a plurality of components configuring the plurality of updated firmware are stored in the archive file 8 for each function. In the archive file 8 according to the third embodiment, an ID is allocated to each unit of component configuring the firmware.

Figure 14:
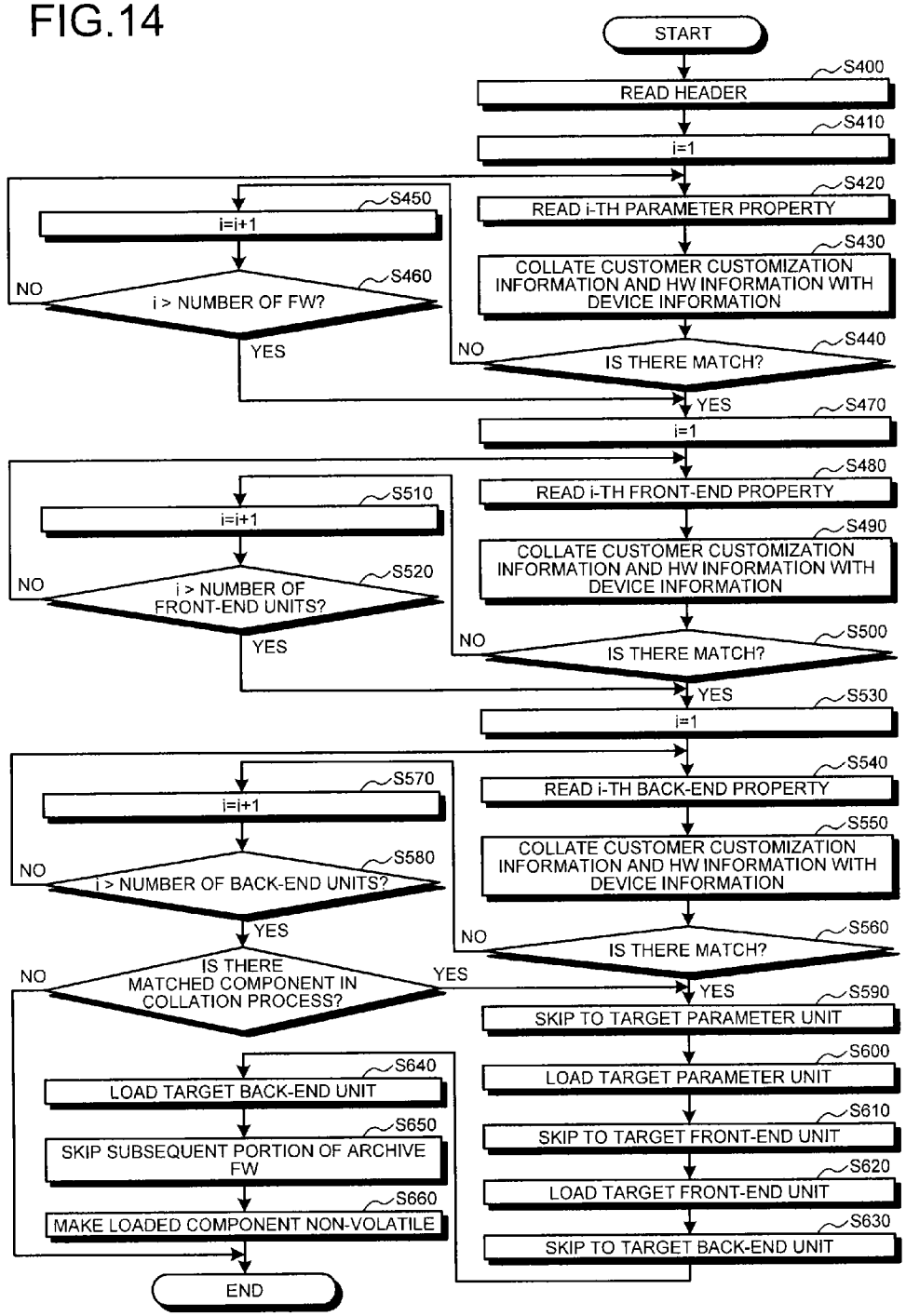
FIG. 14 is a flowchart illustrating an update process of firmware according to the third embodiment.

An update process of the firmware performed by the controller 50 of the memory system 110 according to the third embodiment is explained with reference to FIG. 14. The host 1 transmits a firmware update command (for example, DOWNLOAD MICROCODE) and the archive file 8 to the memory system 110 that performs update of the firmware. Accordingly, the memory system 110 receives the firmware update command and also receives the archive file 8 in the order of the header 8h, the parameter unit 8P, the front-end unit 8F, and the back-end unit 8B.

Upon reception of the firmware update command from the host 1 via the host interface 10, the controller 50 first reads the header 8h of the archive file 8, and analyzes the header 8h (Step S400). The controller 50 then sets i=1 (Step S410)

and reads the i(=1)th component property (a parameter property) 86A (Step S420). The controller 50 collates the customer customization information 93 and the hardware information 94 of the parameter property 86A with the component ID of the memory system 110 (Step S430).

When there is no match in the collation process (NO at Step S440), the controller 50 increments i by 1 (Step S450). The controller 50 determines whether the number of parameter properties read from the archive file 8 exceeds a set value of the number of parameter units 83 in the header 8h (Step S460). When the determination result is YES, the controller 50 shifts the process to Step S470. When the determination result at Step S460 is NO, the controller 50 reads the second parameter property 86B (Step S420), and performs a collation process at Step S430 with respect to the second parameter property 86B. In this manner, the controller 50 repeats the process at Steps S420 to S460 until there is a match in the collation process at Step S440.

When there is a match in the collation process at Step S440, the controller 50 recognizes the top position and the size of the parameter to be acquired based on the parameter-unit offset value 91 and the parameter unit size 92 included in the parameter property in which there is a match in the collation process.

The controller 50 then sets i=1 (Step S470) and reads the i(=1)th front-end property 86E (Step S480). The controller 50 collates the customer customization information 97 and the hardware information 98 of the front-end property 86E with the component ID of the memory system 110 (Step S490).

When there is no match in the collation process (NO at Step S490), the controller 50 increments i by 1 (Step S510). The controller 50 determines whether the number of front-end properties read from the archive file 8 exceeds a set value of the number of front-end units 84 in the header 8h (Step S520). When the determination result is YES, the controller 50 shifts the process to Step S530. When the determination result at Step S520 is NO, the controller 50 reads the second front-end property (Step S480), and performs the collation process at Step S490 with respect to the second front-end property. In this manner, the controller 50 repeats the process at Steps S480 to S520 until there is a match in the collation process at Step S500.

When there is a match in the collation process at Step S500, the controller 50 recognizes the top position and the size of the front-end FW unit to be acquired based on the front-end-unit offset value 95 and the front-end unit size 96 included in the front-end property in which there is a match in the collation process.

The controller 50 then sets i=1 (Step S530) and reads the i(=1)th back-end property 86F (Step S540). The controller 50 collates the customer customization information 103 and the hardware information 104 of the back-end property 86F with the component ID of the memory system 110 (Step S550).

When there is no match in the collation process (NO at Step S560), the controller 50 increments i by 1 (Step S570). The controller 50 determines whether the number of back-end properties read from the archive file 8 exceeds a set value of the number of back-end units 85 in the header 8h (Step S580). When the determination result is YES, the controller 50 determines whether there is a matched component property in the collation process at Step S430, S490, or S500 (Step S585). When there is no matched component property, the controller 50 finishes the update process of the firmware. When the determination result at Step S585 is YES, the controller 50 shifts the process to Step S590. When the determination result at Step S580 is NO, the controller 50 reads the second back-end property 86G (Step S540), and performs the collation process at Step S550 with respect to the second back-end property 86G. In this manner, the controller 50 repeats the process at Steps S540 to S580 until there is a match in the collation process at Step S560.

When there is a match in the collation process at Step S560, the controller 50 recognizes the top position and the size of the back-end FW unit to be acquired based on the back-end-unit offset value 101 and the back-end unit size 102 included in the back-end property in which there is a match in the collation process.

The controller 50 acquires an offset value and a size corresponding to the component (the parameter unit, the front-end FW unit, or the back-end FW unit) from the component property including the customer customization information 103 and the hardware information 104 that match the component ID of the memory system 110.

The controller 50 acquires only the component required for update from data images in the archive file 8 transferred from the host 1, based on the offset value and the size of the acquired respective components, and loads the component in the storage region of the RAM 40 (Steps S590 to S650). That is, the controller 50 skips acquisition of a component portion, which is not required for update of the firmware of the memory system 110 of its own as in the first and second embodiments. In other words, the controller 50 loads only the component required for update of the firmware in the storage region of the RAM 40, and discards other components without loading the other components in the RAM 40.

For example, in FIG. 12, it is assumed that the customer customization information 93 and the hardware information 94 of the component property 86C, the customer customization information 97 and the hardware information 98 of the component property 86E, and the customer customization information 103 and the hardware information 104 of the component property 86F match the component ID of the memory system 110. In this case, the position information of the respective components described below is acquired. The position information of the respective components to be acquired includes the parameter-unit offset value=24, the parameter size=8, the front-end-unit offset value=40, the front-end unit size=256, the back-end-unit offset value=296, and the back-end unit size=300.

The controller 50 skips from the top of the archive file 8 to the position having the offset value "24" (Step S590). The controller 50 acquires data having the size "8" from the position having the offset value "24", and loads the data in the storage region of the RAM 40. Accordingly, the parameter unit having the number "3" is loaded in the storage region of the RAM 40 (Step S600).

The controller 50 skips from the top of the archive file 8 to the position having the offset value "40" (Step S610). The controller 50 acquires data having the size "256" from the position having the offset value "40", and loads the data in the storage region of the RAM 40. Accordingly, the front-end unit having the number "0" is loaded in the storage region of the RAM 40 (Step S620).

The controller 50 then skips from the top of the archive file 8 to the position having the offset value "296" (Step S630). The controller 50 acquires data having the size "300" from the position having the offset value "296", and loads the data in the storage region of the RAM 40. Accordingly, the back-end unit having the number "0" is loaded in the storage region of the RAM 40 (Step S640). When there are more pieces of data thereafter, acquisition of the subsequent portion of data is skipped and the data is discarded (Step S650).

The controller 50 stores the respective components configuring the updated firmware and temporarily stored in the storage region of the RAM 40 in a predetermined region of the NAND 30, and makes the components non-volatile. The respective components of the firmware are updated in this way (Step S660).

According to the memory system of the third embodiment, a plurality of components that configure the plurality of updated firmware are stored in the archive file 8 for each function, and the identification information is allocated to each unit of component. Therefore, update of the firmware in a unit of component can be performed. The size of the firmware in an archive format is further reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
a non-volatile semiconductor memory in which first firmware is stored, the first firmware including first and second components, the first component including first information, the first information being information that identifies the first component, the second component including second information, the second information being information that identifies the second component; and
a controller that executes the first firmware to control the non-volatile semiconductor memory, wherein the controller is configured to:
receive a command and an archive file for updating the first firmware, the archive file including a header and one or a plurality of third components, and one or a plurality of fourth components, the header including a plurality of third information, each of the third information including fourth information, the fourth information indicating a position on the archive file of a corresponding component of the one or plural third components and the one or plural fourth components,
acquire the header of the received archive file,
select fifth information from the plurality of third information included in the acquired header by comparing the plurality of third information included in the header with the first information, and select sixth information from the plurality of third information included in the acquired header by comparing the plurality of third information included in the header with the second information, the fifth information being third information corresponding to the first component, the sixth information being third information corresponding to the second component,
acquire seventh information being the fourth information included in the selected fifth information,
acquire a component from the one or plural third components and the one or plural fourth components included in the archive file, based on the acquired seventh information,
acquire eighth information being the fourth information included in the selected sixth information,
acquire a component from the one or plural third components and the one or plural fourth components included in the archive file, based on the acquired eighth information, and
update the first and second components of the first firmware by the component based on the acquired seventh information and the component based on the acquired eighth information.

2. The memory system according to claim 1, further comprising a volatile memory, wherein the controller is further configured to
store the acquired components in the volatile memory, and
not store, in the volatile memory, a fifth component and a sixth component, the fifth component being third component among the one or plural third components included in the archive file excluding the acquired component, the sixth component being fourth component among the one or plural components included in the archive file excluding the acquired component.

3. The memory system according to claim 1, wherein each of the plurality of third information includes ninth information, the ninth information indicating an applicable device of second firmware, the second firmware including the corresponding third component of the one or plural third components and the corresponding fourth component of the one or plural forth components.

4. The memory system according to claim 3, wherein the ninth information includes information indicating a model of the memory system to which the second firmware is applied, and a memory capacity of the non-volatile semiconductor memory included in the memory system to which the second firmware is applied.

5. The memory system according to claim 1, wherein the fourth information includes an offset value from a top of the archive file to the corresponding component of the one or plural third components and the one or plural fourth components, and a size of the corresponding component of the one or plural third components and the one or plural fourth components.

6. The memory system according to claim 1, wherein the first and third components correspond to a front-end unit, and the second and fourth components correspond to a back-end unit.

7. The memory system according to claim 1, wherein the header includes information indicating a number of the plurality of second firmware included in the archive file.

8. The memory system according to claim 1, wherein the non-volatile semiconductor memory is a NAND type flash memory.

* * * * *